March 13, 1956 V. E. PARSONS 2,738,240
SELF-ALIGNING, SELF-LUBRICATING, VIBRATION-ABSORBING BEARING
Filed Dec. 26, 1951
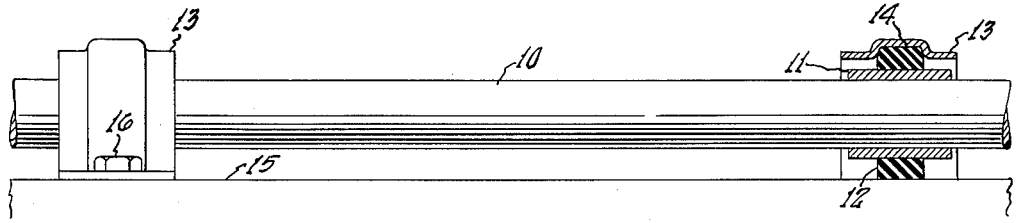
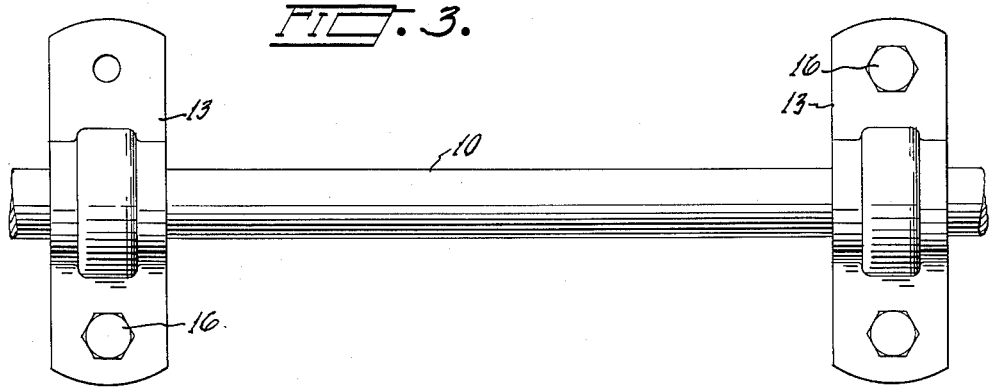
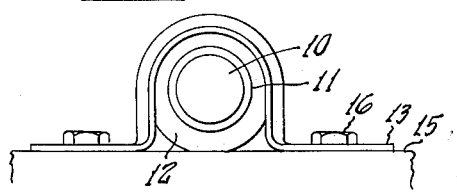 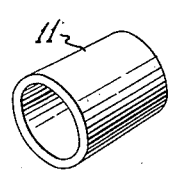 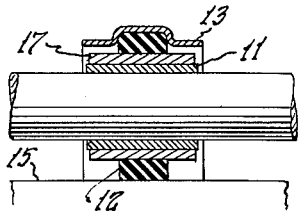
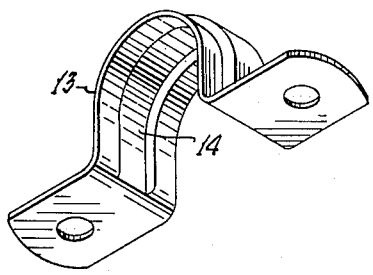 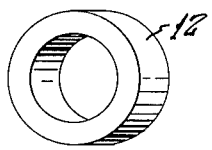
INVENTOR
VOHN E. PARSONS
BY E. H. Birkenbeul
ATTORNEY

United States Patent Office 2,738,240
Patented Mar. 13, 1956

2,738,240

SELF-ALIGNING, SELF-LUBRICATING, VIBRATION-ABSORBING BEARING

Vohn E. Parsons, Lebanon, Oreg.

Application December 26, 1951, Serial No. 263,273

1 Claim. (Cl. 308—26)

This invention relates generally to bearings for shafts and particularly to an inexpensive type of self-aligning, self-lubricating, vibration-absorbing bearing.

The main object of this invention is to provide a bearing from simple and easily obtainable parts which will serve satisfactorily in many places where free running bearings are desirable and in which anti-friction bearings cannot be used on account of high first costs.

I accomplish these and other objects in the manner set forth in the following specifications as illustrated in the accompanying drawing, in which Fig. 1 is a side elevation showing a section of shafts supported by two of my bearings, with one bearing shown in longitudinal section.

Fig. 2 is an end elevation.

Fig. 3 is a plan.

Fig. 4 is a perspective view of the bearing sleeve.

Fig. 5 is a perspective view of the resilient ring.

Fig. 6 is a perspective view of the supporting clamp.

Fig. 7 is a longitudinal section through a modified form of the device.

Like numbers of reference refer to the same or similar parts throughout the several views.

Referring in detail to the drawing, there is shown a section of shaft 10 which in this instance is supported at two places by oilless bearing sleeves 11 around which are disposed the resilient rings 12 which are preferably rectangular in cross-section and made of rubber or one of the well-known substitutes, such as Neoprene, which is not affected by oil. A band clamp 13 having a groove 14 formed on its inner side surrounds the sleeve 11 and ring 12 and is secured to a support 15 by means of screws 16. The relation of the clamp groove 14 and the ring 12 is such as to compress the ring 12 around the sleeve 11 when the clamp 13 is secured in place by means of the screws 16.

It can be seen that any misalignment of the sleeves 11 will be prevented by the rings 12, which will permit the sleeves to be secured in perfect alignment and at the same time absorb the vibrations which might otherwise flow from the shaft 10.

It can also be seen that by this arrangement free-running bearings can be used in numerous places where the use of anti-friction bearings is not warranted on account of the cost.

Where the shaft is subjected to heavy loads, it may be found desirable to press the sleeve 11 into a casing 17.

While I have thus illustrated and described my invention, it is not my intention to be limited to the precise form but I do intend to cover all such forms and modifications thereof as fall fairly within the appended claim.

I claim:

A shaft bearing comprising a cylindrical sleeve of self-lubricating material, a resilient ring of substantially rectangular cross section encircling the intermediate portion of said sleeve at a distance from both ends thereof, a band clamp of semi-cylindrical form having an internal circumferential groove of approximately rectangular cross section, said groove receiving substantially half the thickness of said ring whereby said clamp is spaced from said sleeve, and outturned feet on said clamp disposed in a common plane approximately tangential to one side of said ring for clamping said ring against a flat supporting surface.

References Cited in the file of this patent

UNITED STATES PATENTS

| | | |
|---|---|---|
| 2,159,327 | Hendrick | May 23, 1939 |
| 2,371,206 | Zink et al. | Mar. 13, 1945 |
| 2,580,119 | Meyers | Dec. 25, 1951 |